United States Patent [19]

Barry

[11] Patent Number: 5,408,654

[45] Date of Patent: Apr. 18, 1995

[54] METHOD TO REORGANIZE AN INDEX FILE WITHOUT SORTING BY CHANGING THE PHYSICAL ORDER OF PAGES TO MATCH THE LOGICAL ORDER DETERMINED FROM THE INDEX STRUCTURE

[75] Inventor: Richard E. Barry, Houston, Tex.

[73] Assignee: CDB Software, Inc., Houston, Tex.

[21] Appl. No.: 889,454

[22] Filed: May 27, 1992

[51] Int. Cl.6 .................. G06F 7/22; G06F 15/419
[52] U.S. Cl. ............................ 395/600; 364/281.8;
364/251.6; 364/DIG. 1
[58] Field of Search .......................... 395/600, 425;
364/DIG. 1

[56] References Cited

U.S. PATENT DOCUMENTS

| 4,679,139 | 7/1987  | Durbin         | 395/425    |
|-----------|---------|----------------|------------|
| 4,890,226 | 12/1989 | Itoh           | 395/425    |
| 5,117,495 | 5/1992  | Liu            | 395/600    |
| 5,121,493 | 6/1992  | Ferguson       | 395/600    |
| 5,204,958 | 4/1993  | Cheng et al.   | 395/600    |
| 5,222,235 | 6/1993  | Hintz et al.   | 395/600    |
| 5,241,474 | 8/1993  | Marovac        | 364/419.01 |
| 5,269,019 | 12/1993 | Peterson et al.| 395/600    |

OTHER PUBLICATIONS

IBM DB2 Utilities Guide, Reorg Chap, pp. 103-114, No Date.
IBM DB2 Command and Utility Reference, pp. 266-272, Reorg Utility, No Date.
Platinum, Put User Guide, pp. 4-1 to 4-10, Feb. 1992.
Hauser et al DB Journal, DB2 2.3 Reorg Tablespace Performance, Aug. 1992, pp. 24-29.

Primary Examiner—Thomas G. Black
Assistant Examiner—Jack M. Choules
Attorney, Agent, or Firm—Pravel, Hewitt, Kimball & Krieger

[57] ABSTRACT

A method for reorganizing database index files without performing a conventional sort operation. The index file uses a balanced tree structure, with the logical order of the entries in each page being maintained by the database program. In the reorganizing method the logical order of the leaf pages is determined. A logical order buffer is developed which correlates the logical order to the physical order. This buffer is transposed to a physical order to logical order buffer. A large buffer is set aside in memory and the index file is read sequentially. As each physical page is read, it is placed in its logical position in the large memory buffer. When the large buffer is filled, the pages are sequentially written to a new index file, with the various tree pages being developed in the fly. When the writing operation is completed, the old index file is removed and the new, ordered index file is used.

5 Claims, 12 Drawing Sheets

FIG. 6

| LOGICAL | 1 | 2 | 3 | 4 | 5 | 6 | 7 | 8 | 9 | 10 | 11 |
|---|---|---|---|---|---|---|---|---|---|---|---|
| PHYSICAL | 8 | 10 | 3 | 6 | 11 | 4 | 7 | 14 | 15 | 12 | 13 |

| PHYSICAL | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| LOGICAL | 0 | 0 | 0 | 3 | 6 | 0 | 4 | 7 | 1 | 0 | 2 | 5 | 10 | 11 | 8 | 9 |

| MEMORY SPACE | PAGE |
|---|---|
| | 15 |
| | 14 |
| | 13 |
| | 12 |
| 13 | 11 |
| 12 | 10 |
| | 9 |
| | 8 |
| 7 | 7 |
| 4 | 6 |
| 11 | 5 |
| 6 | 4 |
| 3 | 3 |
| 10 | 2 |
| 8 | 1 |

| MEMORY SPACE | PAGE |
|---|---|
| | 15 |
| | 14 |
| | 13 |
| | 12 |
| 13 | 11 |
| 12 | 10 |
| | 9 |
| 14 | 8 |
| 7 | 7 |
| 4 | 6 |
| 11 | 5 |
| 6 | 4 |
| 3 | 3 |
| 10 | 2 |
| 8 | 1 |

| MEMORY SPACE | PAGE |
|---|---|
| | 15 |
| | 14 |
| | 13 |
| | 12 |
| 13 | 11 |
| 12 | 10 |
| 15 | 9 |
| 14 | 8 |
| 7 | 7 |
| 4 | 6 |
| 11 | 5 |
| 6 | 4 |
| 3 | 3 |
| 10 | 2 |
| 8 | 1 |

METHOD TO REORGANIZE AN INDEX FILE WITHOUT SORTING BY CHANGING THE PHYSICAL ORDER OF PAGES TO MATCH THE LOGICAL ORDER DETERMINED FROM THE INDEX STRUCTURE

BACKGROUND OF THE INVENTION

1. Field of the Invention

The invention relates to a method for sorting and reorganization of computer files, and more particularly, to a method for reorganizing a database index file.

2. Description of the Related Art

Databases are used on computers for a myriad of reasons. In many cases the databases are extremely large, having entries in the millions. When databases reach this size, and the information is needed in a transactional or real time basis, mainframe computers are utilized. International Business Machines Corp. (IBM) has developed a database environment referred to as DB2 for use on its mainframes. Given IBM's high market percentage in mainframes, DB2 is clearly the leading database system.

One feature common in all database systems and included in DB2 is the capability to index various information. The use of the index allows very fast access for searches and requests based on the indexed information. DB2 uses a balanced tree index structure. In this structure, root, tree and leaf pages are used, with each page at each level containing the same number of entries, except of course the last one. The leaf pages are the lowest level and each contains a number of entries referring to the actual data records contained in the DB2 data tables. Each leaf page is maintained in internal logical order automatically by DB2. Tree pages are the next level up, and are used to indicate the logical order of the leaf pages. For large databases, there may be many several layers of tree pages, a higher level of tree pages referencing a lower level of tree pages. Ultimately the number of tree pages is reduced such that all the entries or references fit into a single page referred to as the root page. As in leaf pages, within each tree or root page the entries are kept in logical order automatically by DB2.

One problem with such an index organization is that the physical location of the leaf pages often becomes quite scattered. This scattering results in reduced performance as now the storage device must move between widely scattered physical locations if logical order operations are to be performed. This is true of whatever type of Direct Access Storage Device (DASD) is used to store the index file. Therefore the index files need to be reorganized periodically so that the logical and physical ordering of the leaf pages better correspond.

IBM provides a utility with DB2 to reorganize the index file. Several other third-party DB2 utility providers also have index reorganization packages. These packages usually operate in the same manner. First, the entire index file is read in physical order. Each leaf page in the index file is then separated into its component record entries. Next, the record entries are sorted by key value using a conventional sort package. Finally, the sorted records are rewritten back into the index file. While this process may sound simple, it must be understood that quite often there are hundreds of thousands to millions of entries in the index file. When this number of entries is considered, then the process becomes quite time consuming, particularly the sorting step. The third party packages are faster than IBM's utility, but primarily because the sort packages used are more efficient. So even in those cases the process is quite tedious and is done less frequently than desirable, so overall database performance suffers. Therefore it is desirable to have a significantly faster DB2 index reorganization method, so that the indices can be reorganized more frequently and overall operations made more efficient.

SUMMARY OF THE INVENTION

The present invention relates to an improved method to dramatically reduce the time required to reorganize an index file, particularly a tree structure file as used by DB2.

As a first general operation, the logical order of the leaf pages is determined by accessing the index tree. A buffer is used to receive the physical page number of the leaf pages in logical order. This buffer is then transposed into a physical order buffer, with the logical order value associated with the physical order value. After this, a large buffer is set aside in memory to receive a copy of all the leaf pages in the index file. The index file is then read in a sequential operation. As each physical page is read, the transposed or physical order buffer is accessed to find the proper logical page. If a leaf page has just been read, it is then placed in the large buffer in its logical position. When the entire index file is read and the leaf pages written to the large buffer, the large buffer is in a reorganized logical order. These leaf pages are then sequentially written to a new index file, with the tree pages interspersed as they are filled. When the write operations are completed, the new index file replaces the old index file and the index has been reorganized.

Preferably the writing of the new index file can occur concurrently with the filling of the large buffer. As the beginning of the buffer becomes filled, the beginning entries can be written to the new index file, so that the write process is effectively racing the read and fill processes. If the index is not badly scattered, the concurrence can further reduce the total required time of the reorganization process.

Therefore the reorganization is performed without a conventional sorting process, greatly speeding up operations. Further, no operations are made below the level of a leaf page, thus reducing the total number operations to be performed, which also decreases the required times.

BRIEF DESCRIPTION OF THE FIGURES

A better understanding of the present invention can be obtained when the following detailed description of the preferred embodiment is considered in conjunction with the following drawings, in which:

FIG. 6 illustrates the organization of an exemplary buffer organized in logical order of leaf pages;

FIG. 7 illustrates the organization of the buffer of FIG. 6 in physical order;

FIGS. 8A–8K illustrate the filling of a large memory space buffer in logical order with leaf pages obtained in physical order;

DETAILED DESCRIPTION OF THE PREFERRED EMBODIMENT

Figure 1:
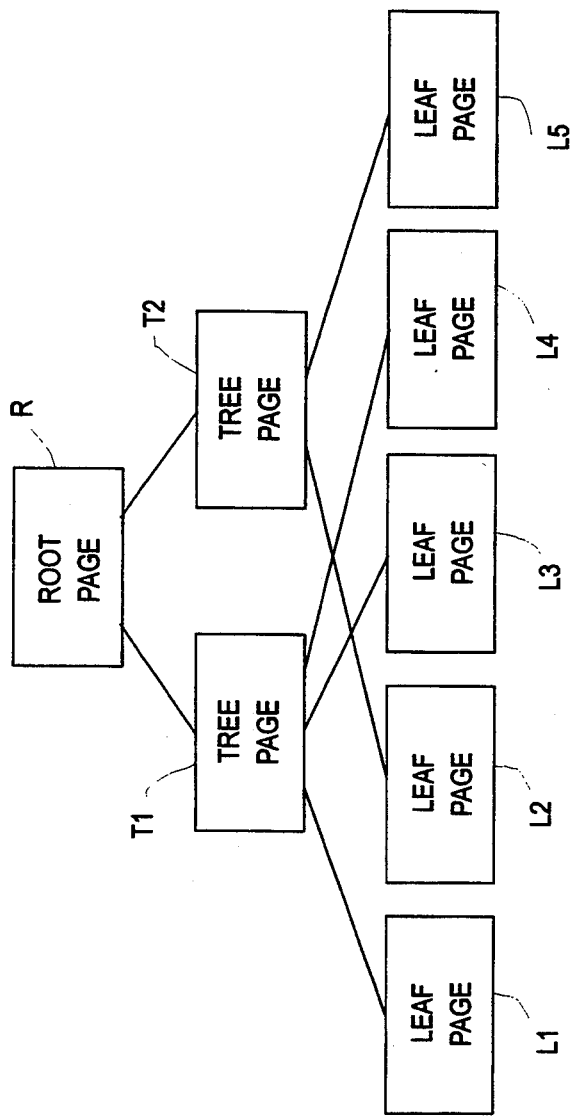
FIG. 1 is a representation of a balanced tree structure.

Referring now to FIG. 1, a balanced tree structure such as used in a DB2 index file is shown. A root page R is at the top of the tree and contains entries directing to the two tree pages T1 and T2. Each of the tree pages T1 and T2 contain a plurality of entries which point to various leaf pages L1–L5. Each leaf page then also finally contains a series of entries which directly point to the table space pages in the table with which the index is associated. It is understood that in a DB2 file the entries in each individual leaf page L1–L5 are kept in logical order by the DB2 system itself. Similarly, the entries in each of the tree pages T1 and T2 and the root page R are also similarly automatically kept ordered in logical order within the page itself.

Figure 2:
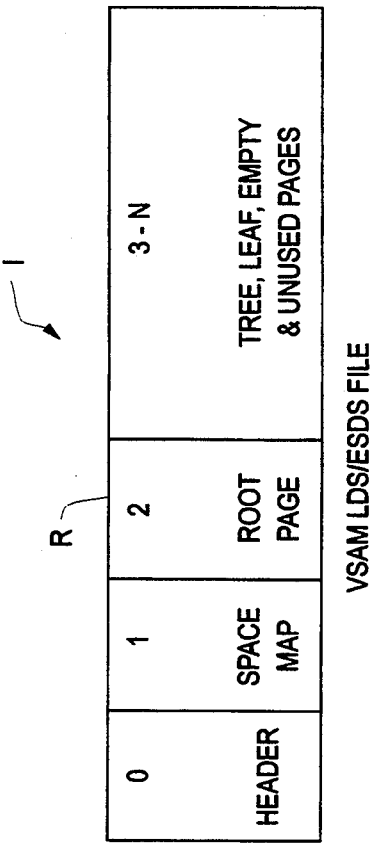
FIG. 2 is a representation of the page order of a DB2 index file.

FIG. 2 is a sequential representation of a DB2 index file, which is a VSAM data set in either ESDS or LDS format. It is understood that when various initials are utilized, these are considered well known to those skilled in the art of IBM mainframes and DB2 and thus the full acronym may not be provided. The index file, generally referred to by the letter I, in FIG. 2 has a first page 0 which is a header page. This header page contains particular information needed to indicate to the various packages and programs, most particularly to the operating system of the machine, the type of file and other related information. The second page of the index file I is a space map which indicates which particular subsequent pages in the file are currently active for that particular index file, these pages either being tree pages or leaf pages. The third page, page 2, is the root page R. The remaining pages in the index file I are tree, leaf, empty and unused pages in whatever order has developed through the use of the DB2 indexing process.

Figure 3:
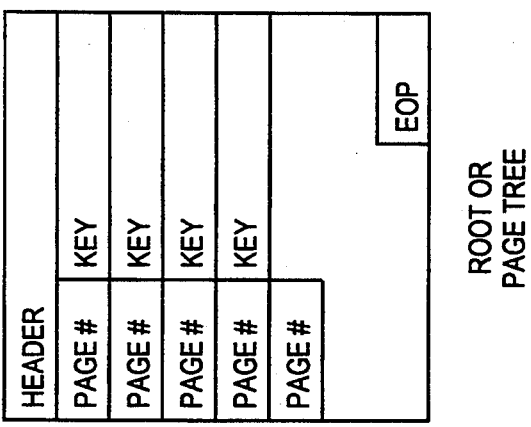
FIG. 3 is a representation of the structure of a root or tree page in a DB2 index file.

FIG. 3 illustrates the organization of information inside a particular root or tree page. The page starts with a header which contains various control information needed by DB2. Following this is a series of page number and key value entries, with the final entry being a single page number entry and the page concluding with an EOP or end of page indicator. For each of the series of page number and key value entries, the page number indicates the particular physical page which contains the next level down in the tree structure and the key value indicates the highest index key value contained in that particular page. The final page number in the particular root or tree page does not need a key value, as no further reference is necessary to higher key values. It is of course understood that if the index is sufficiently small, no tree pages are actually present and the root page can actually be a leaf page, but this is an unusual condition in that the database is then very small. A much more conventional structure, as indicated before, has multiple layers of tree pages between the root page and the leaf pages. If the particular structure of the index file had three levels, then the root page would indicate the appropriate number of references to specific tree pages, which tree pages would then also contain entries to another level of tree pages, which tree pages would then finally point to the leaf pages. It is also noted that for the examples in this specification show only a very limited number of entries in each page for simplicity. It is understood that in actual use a DB2 index file root or tree page will contain up to 1000 entries depending on the length of the key value, while the leaf files may contain up to 800 entries as described below, though normally a tree page has approximately 100 entries and a leaf page has approximately 70 entries.

Figure 4B:
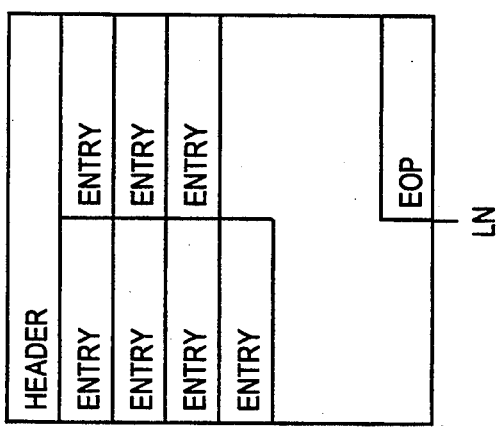
FIGS. 4A and 4B are representations of the structures of the leaf pages in a DB2 index file.
Figure 4A:
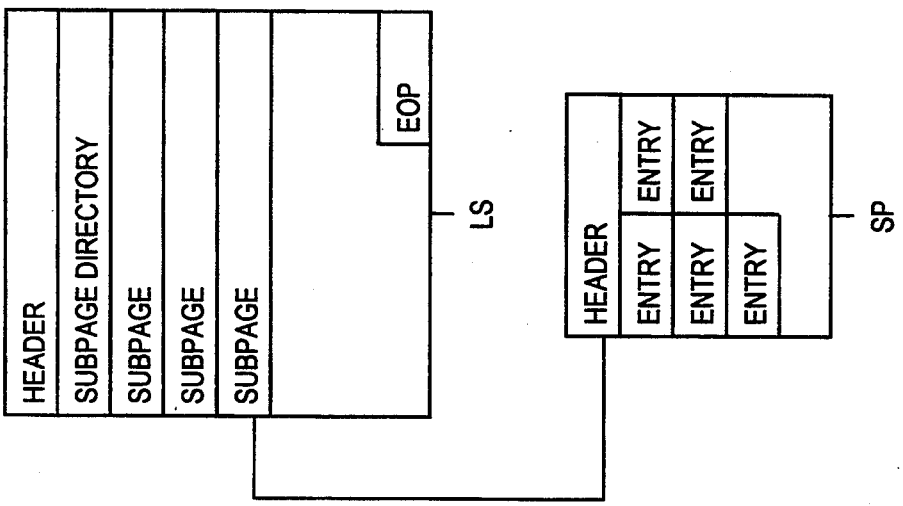

FIGS. 4A and 4B illustrate the two various arrangements of leaf pages allowable in a DB2 index file. In the version shown in FIG. 4A, referred to as a segmented leaf page LS, the page contains a header which contains control information, followed by a subpage directory, which is a series of offsets to the particular subpages contained in the particular page and to the various high key values. Then follows a series of subpages followed by an end of page indicator. Shown below the leaf page LS is a single subpage SP which also contains a header for control information and a plurality of entries which are the actual index values. It is understood that each of the subpages has the structure as in the subpage SP. FIG. 4B shows an alternative non-segmented leaf page LN. The non-segmented leaf page LN contains a header for the necessary control information and then simply a plurality of entries which are the index entries. Therefore FIGS. 3, 4A and 4B show the structure of the various page entries present in the index file I.

Figure 5:
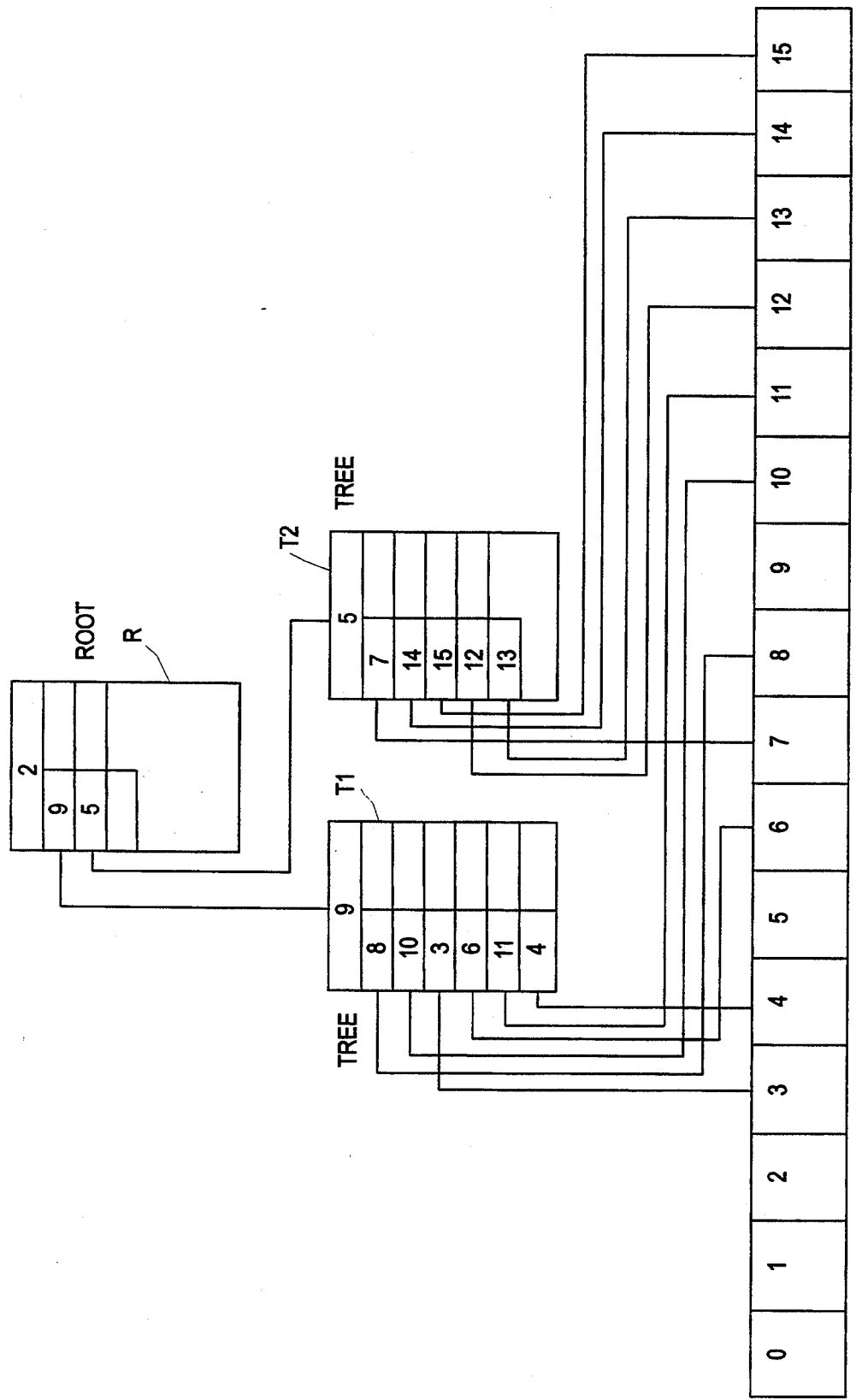
FIG. 5 illustrates the linkages in an exemplary DB2 index file tree structure.

FIG. 5 is an exemplary representation showing particular root and tree pages R, T1 and T2, wherein the particular physical page numbers have been illustrated. Again it is noted that this is a very simple example utilizing only 13 leaf pages, 2 tree pages and a single root page. Of course, in a typical index file there would be thousands to hundreds of thousands to millions of these particular pages. However, the particular example is used to indicate the method of the preferred embodiment in a much more clear and concise format. In the example of FIG. 5, the root page R is page 2 of the index file I as indicated. The first page number entry, i.e. the first logical tree page, is page 9. Proceeding then to the tree page at page 9, which is tree page T1, tree page T1 contains a series of page number entries. These page number entries are the particular leaf pages in logical order. The six entries in the particular tree page T1 are the physical number of the particular page of the leaf page, while the ordering is from first to last within the particular tree page T1. Similarly, the second tree page T2, which is physical page 5 in the example of FIG. 5, contains five leaf page entries contained in logical order. It can be seen that the physical order of the entries in both the tree pages T1 and T2 and the root page R do not bear any necessary physical relationship at this time. This often develops during use of a particular database in DB2 as items are deleted, rearranged, added and so forth. Looking at the structure of FIG. 5, it can be seen that if a direct access storage device (DASD) were to try and access the various leaf pages in logical order, then the device would be skipping from page 8 to page 10 to page 3 to page 6 and so on in the index file I. All of this random access movement is necessarily slower then the various sequential movements. For example, in the case of a disk drive unit the head would have to be moved to several different locations, i.e. there would be numerous seek requests across several tracks. This is one of the slower operations of a disk drive, so performance of the DB2 system would be reduced.

FIG. 6 shows the development of the first buffer, a logical order buffer LB, utilized in the preferred embodiment. The buffer LB is preferably has a length of the number of leaf pages, in the case of FIG. 6, 11 pages. This buffer LB contains the association of the logical relationship of a particular leaf page to its physical relationship. This is developed by scanning down from the root page R through the various tree pages T1 and T2 in the following sequence. Looking at the root page R, the entries in FIG. 5 indicate tree pages at physical pages 9 and 5. Proceeding to page 9, this is tree page T1, which then has entries 8, 10, 3, 6, 11 and 4. After processing of this tree page T1 has been completed, physical page 5, which is tree page T2, is processed. Tree page T2, has in logical order the leaf pages 7, 14, 15, 12, and 13. Referencing then physical page 8, a review indicates that page 8 and thus the pages on that level are leaf pages and we have reached the effective bottom of the tree. Therefore the particular buffer LB shown in FIG. 6 has a number 8 for the physical page of the logically first leaf page in the first position. The buffer LB then proceeds to contain 10, 3, 6, 11, 4, 7, 14, 15, 12, and 13 as that is the order indicated in the tree pages T1 and T2. These leaf page values are then entered into the buffer LB of FIG. 6 in order. Therefore the buffer LB contains in each effective logical position the physical page location of the particular leaf page having that logical ranking.

The buffer LB is shown transposed or converted into a physical buffer PB in FIG. 7. The physical buffer PB is preferably first cleared so that the various tree and root entries do not receive valid data values and then the logical buffer LB is transposed. The transposition of the logical buffer LB to the physical buffer PB is such that the logical buffer LB is scanned and the logical page value is placed into the physical page number location in the physical buffer PB. For instance, physical location 8 receives the value 1 to indicate that it is the first logical ordered leaf page. This process proceeds for all the entire leaf pages. It is noted that in FIG. 7 that there are various zeroes indicating empty entries in the physical buffer. These are the locations of the empty pages, the various system pages, the root page and the various tree pages. For example pages 2, 5 and 9 are the root and tree pages.

Figure 8A:
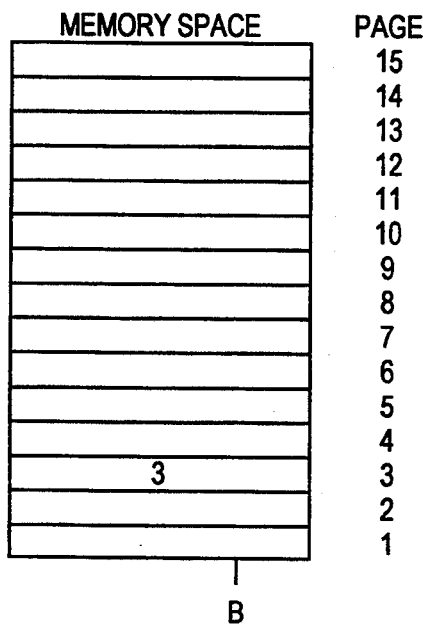

With this buffer PB then developed, a large buffer B is set aside in the memory space of the computer to receive the leaf page information. This large buffer set aside in the memory space has a number of pages equal to the number of leaf pages which are contained in the index file I. In the example, 15 leaf pages are shown in FIG. 8A when in actuality only 11 are necessary for the index file I of FIG. 5. With the physical buffer PB developed, the index file I is then read sequentially. Sequential operations are preferred as this the fastest operation for the DASD device. As the index file I is read sequentially, the particular physical page number of each leaf page is compared against the logical value as indicated by the physical buffer PB. If the value is 0, the not defined value, then this is an empty page, a system page, a root page or a tree page and is not to be entered into the large buffer B. In the given example of the physical buffer PB in FIG. 7, the first valid entry is physical page 3, which is also logical page 3. This particular leaf page is then written into page 3 of the large buffer B. Therefore physical page 3 has been written into what is logical page 3 of the large buffer B, as shown in FIG. 8A.

Figure 8B:
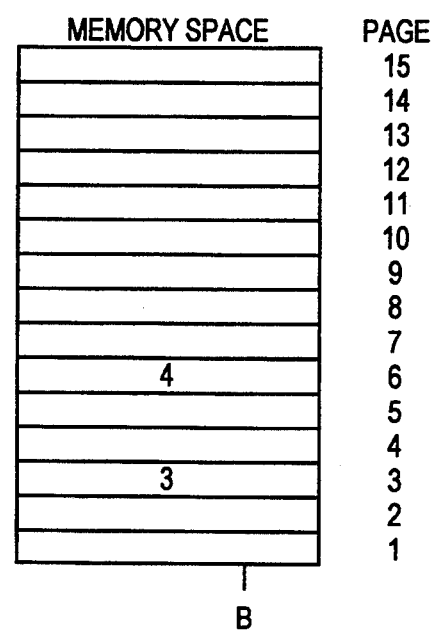
Figure 8C:
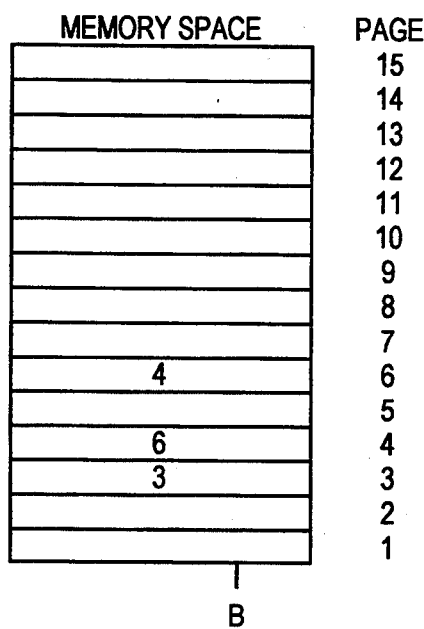
Figure 8D:
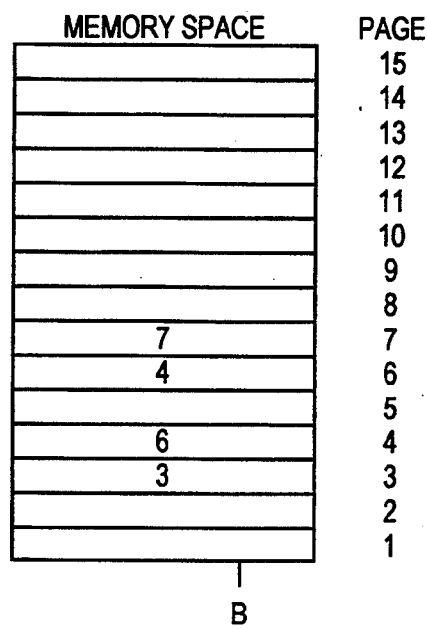
Figures 8E, 8F, 8G, 8H:
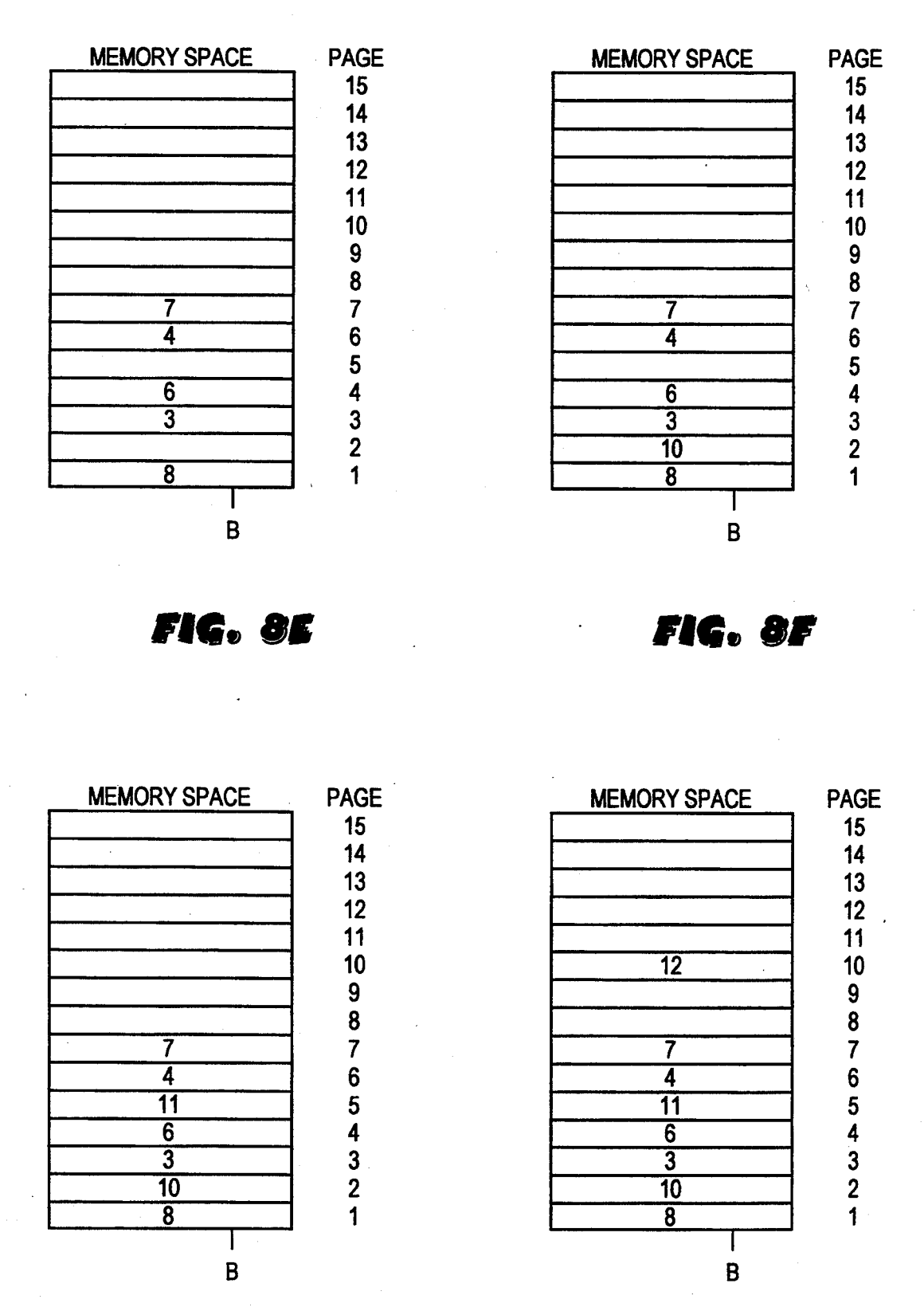

Proceeding, the next value read is physical page 4, which is logical page 6. Thus the leaf page 4 is placed into the large buffer B page 6 as shown in FIG. 8B, so that logical ordering is beginning to occur. The next page read from the index file I is page 5 and there is a zero value in the physical buffer PB, so this is a tree page. The next physical page read is page 6, which has an associated logical value of 4 and therefore as shown in FIG. 8C the contents of leaf page 6 are placed in memory space page 4. This proceeds on through the various pages as shown in the sequence FIGS. 8D–8K. By FIG. 8K the entire index file I has been read, so that all the actual leaf page information is present in the large buffer B in its proper logical order, having been read from the physical location and transferred according to the physical buffer PB into the desired logical location. Therefore the large buffer B as indicated in FIG. 8K has all of the leaf pages in proper logical order.

Figure 9:
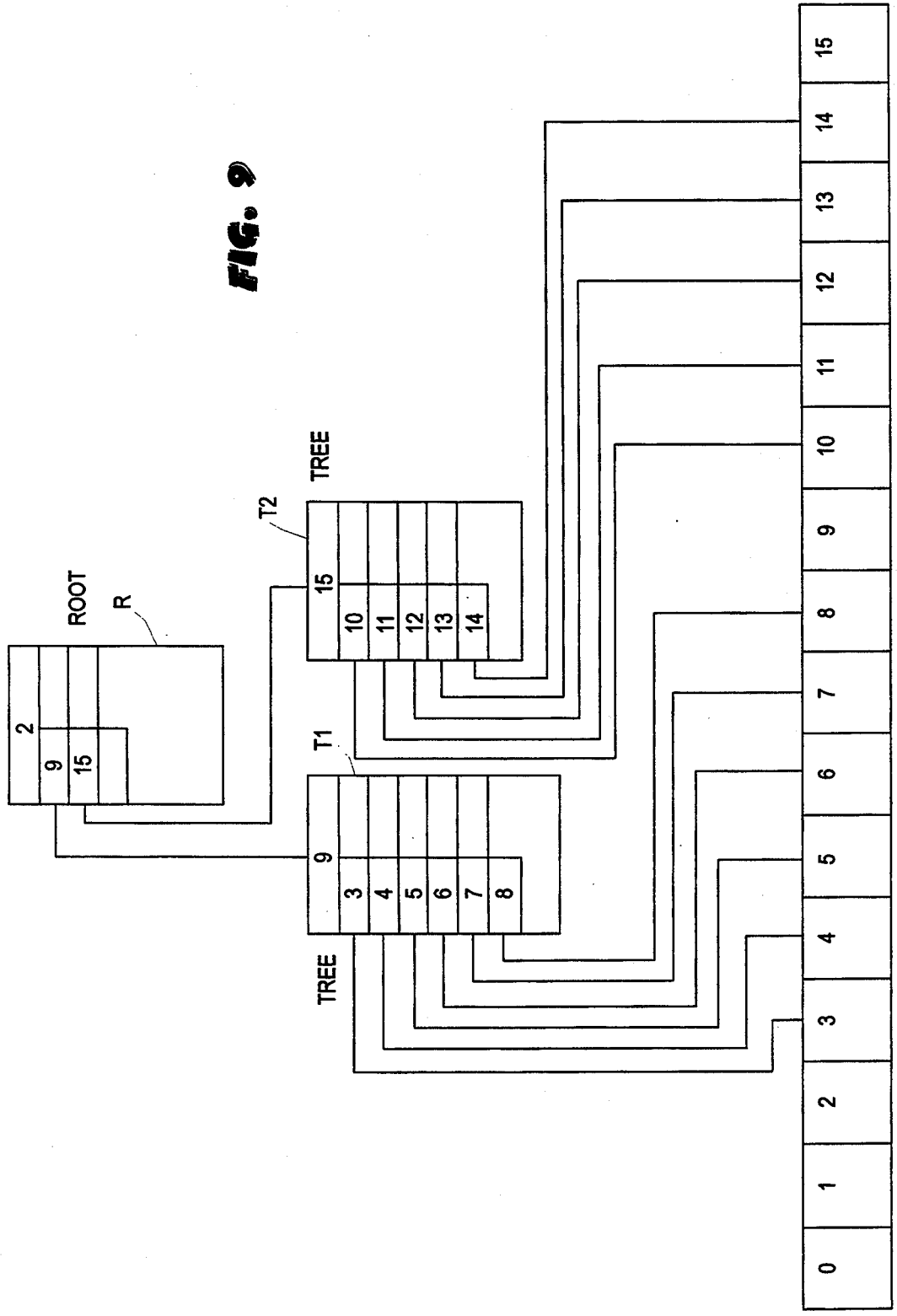
FIG. 9 illustrates the linkages of the DB2 index file of FIG. 5 after reorganization.
Figure 10A:
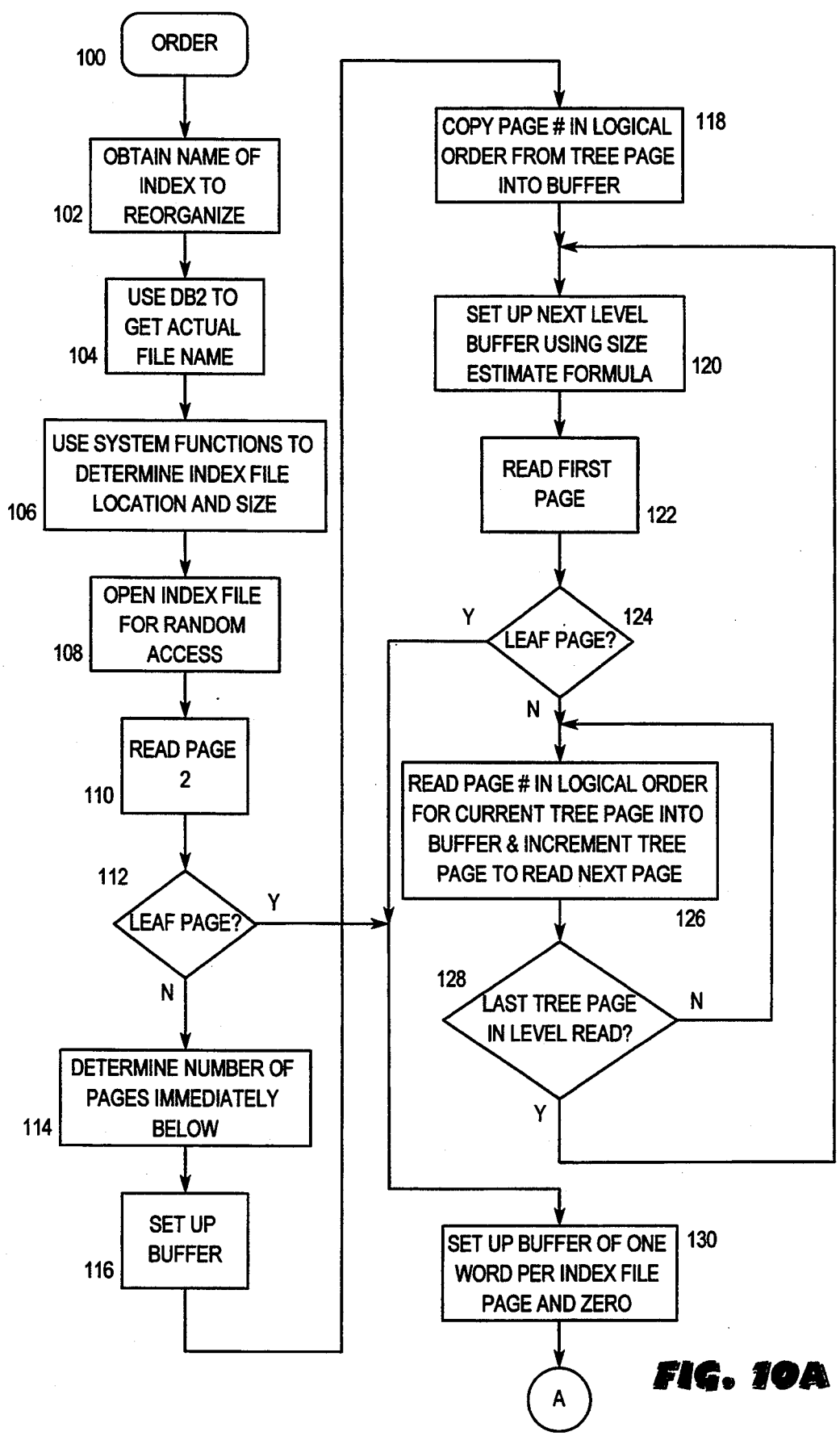
FIGS. 10A and 10B are flowchart illustrations of the sequence of filling the large buffer.
Figure 10B:
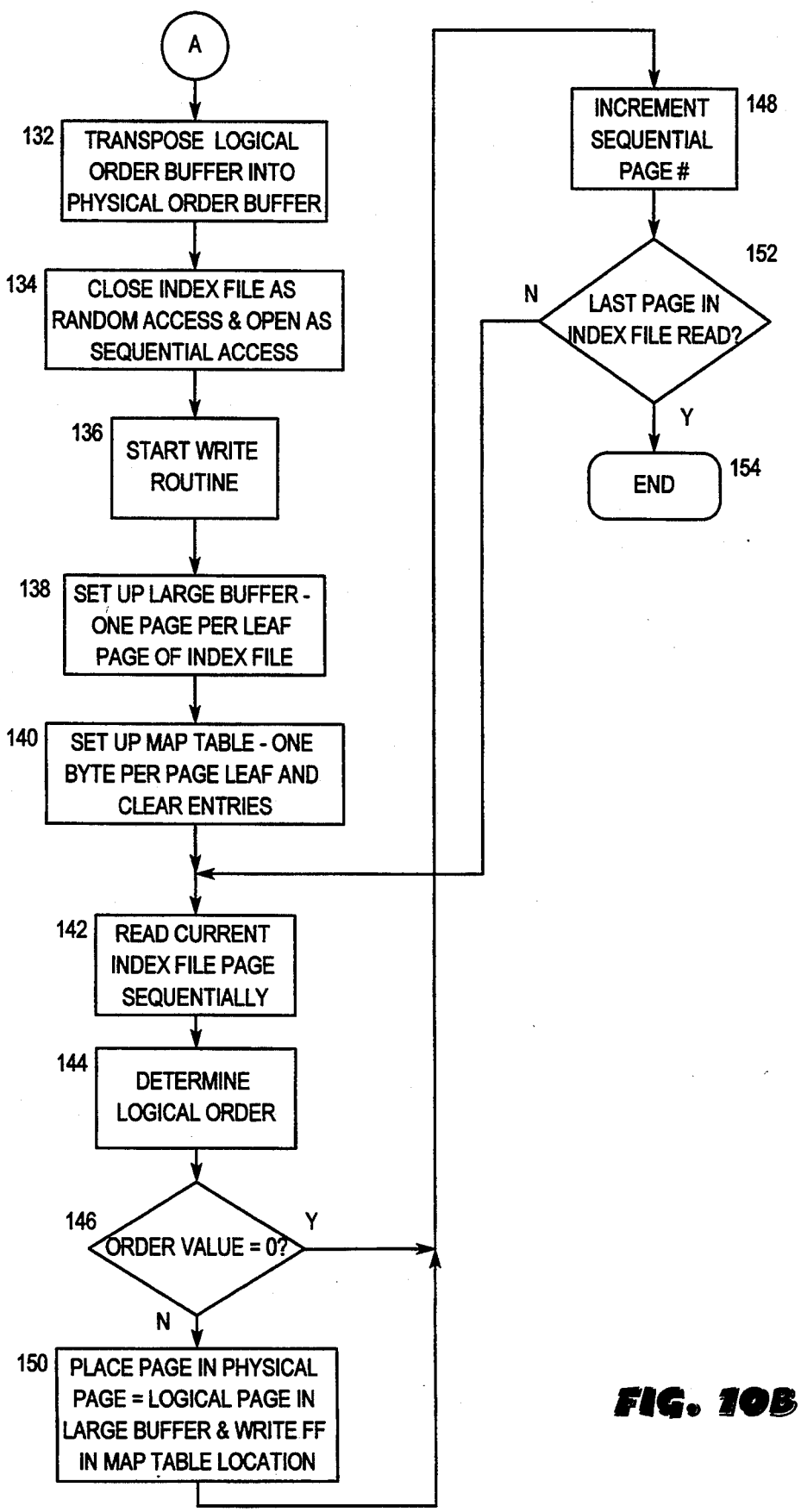
Figure 11A:
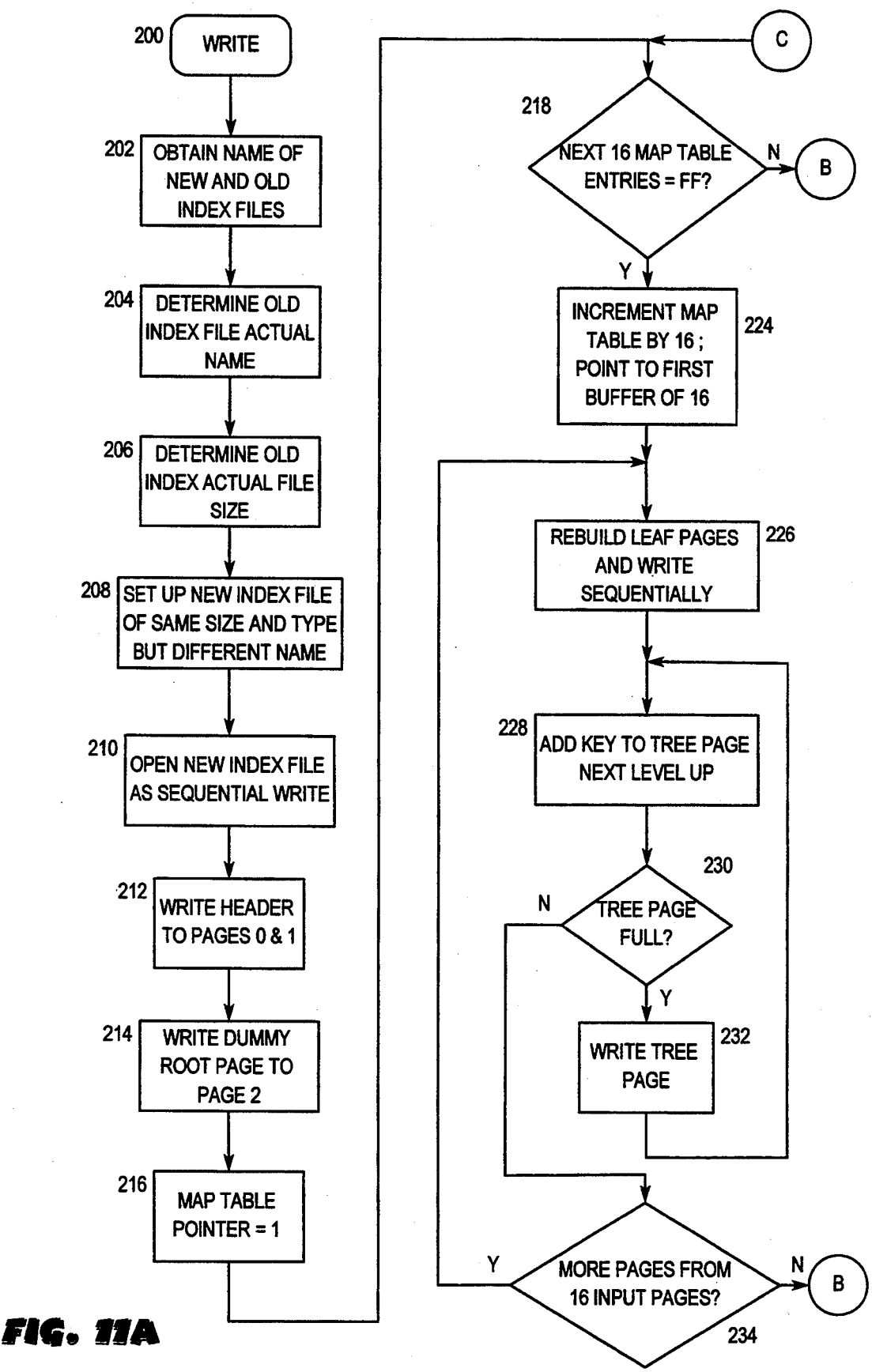
FIGS. 11A and lib are flowchart illustrations of the sequence of writing the contents of the large buffer to a new index file.
Figure 11B:
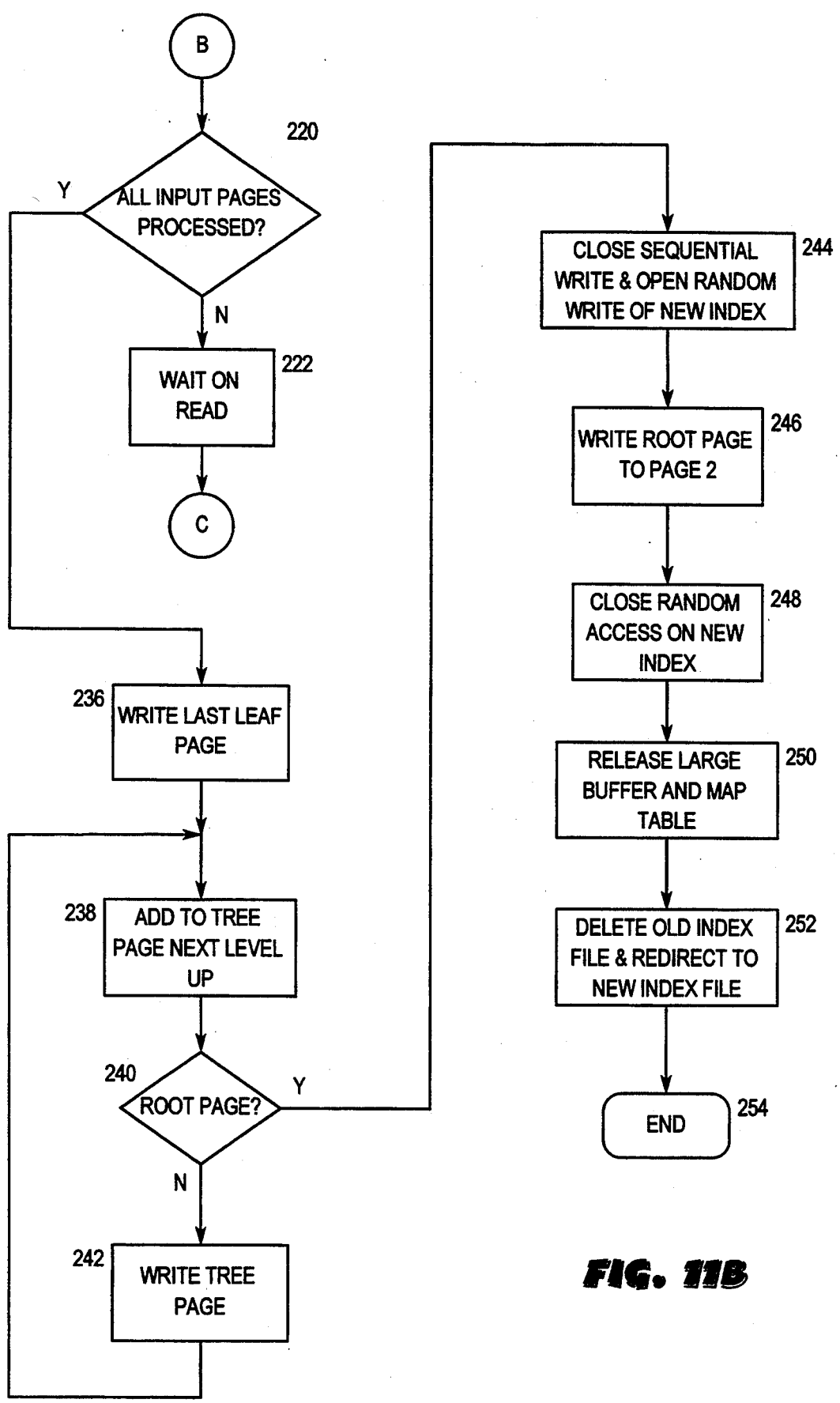

It is then appropriate to write the leaf pages back to a new index file, building the particular root and tree pages as they fill up.. Therefore the new index file structure would be as shown in FIG. 9. Again the root page R is always page 2, while in this case the first tree page T1 is page 9. It is noted that the particular entries in tree page T1 are the various leaf pages and they are in sequential order, i.e. 3, 4, 5, 6, 7 and 8. As the 8th page was the final leaf page for the particular tree page T1, and it filled the tree page, then the tree page T1 is written in page 9. Beginning at page 10 is the next series of sequential leaf pages. After they have all be written, in the example then the tree page T2 is written to page 14, which completes the operation of writing the particular index file. It is again noted that in actual use this writing process will be significantly more complex as there will be numerous levels of trees.

Therefore it can be seen through the processes shown from FIG. 6 to FIG. 7 to FIGS. 8A–8K and then to FIG. 9 that the leaf pages have been very quickly and very simply transferred so that the index file is reorganized from its original physically scattered logical order to a sequential physical and logical order so that DASD operations are greatly enhanced for logical traverses through the index file I. Therefore operations of the DB2 system are enhanced as desired. It is also noted that no conventional sort operation is used but rather only reads through the various tree levels to determine the leaf logical order, then a sequential reading of the leaf pages into memory followed by a writing from memory into an index file which was developed. It is noted that the two major DASD operations, the read to obtain all of the leaf pages and the write to develop the new index file, are both sequential operations. No major random operations are necessary after the development of the logical buffer LB. This greatly enhances performance, particularly as compared to a sorting operation which often utilizes many random accesses of the DASD device.

The flowcharts of FIGS. 10A, 10B, 11A and 11B illustrate sequences utilized to practice the method described above. Order sequence 100 is commenced to reorganize or reorder the particular index file. In step 102 the computer obtains the name of the particular index to be organized. This is generally provided as a batch level command to the order sequence 100. In step 104 DB2 is called to determine the actual file name of the index file so that other system tools can be used to determine information about the index file. Having obtained the actual file name, in step 106 the various system functions present on the computer are utilized to determine the actual DASD location of the index file and its size. This is so that simple file operations can be utilized without having to use the actual DB2 operations. Control then proceeds to step 108, where the index file is opened for random access. This is necessary to develop the tree page structure so that the logical buffer LB can be developed.

Control proceeds to step 110, where page 2, the root page, is read. In step 112 a determination is made as to whether page 2 is a leaf page. If so, this is a very small file. In the more conventional case, it is not a leaf page and control proceeds to step 114 to determine the number of pages immediately below what is now a root page. This is done by reading the number of particular page number entries in the root page. Then a first buffer is set up having that number of pages. After setting up the buffer in step 116, control proceeds to step 118 where the page numbers of the tree pages in logical order are written into this buffer. This then provides a first ordering of the tree, i.e. which branches are to be read first. Control then proceeds to step 120 so that a next level buffer can be developed. Preferably the buffer size is reserved according to the formula $$n = p(4049/(k+3)+1)$$

where n is the number of pages at the next level, p is the number of pages at the current level and k is the length of the key field used in the particular index file. This allows an estimated buffer size that is at least as long as necessary to allow development of the ordering.

Control then proceeds to step 122 to read the first page indicated by the current level buffer written in step 118. If this particular page is a leaf page as determined in step 124, then the tree has been fully traversed and the information present in the current level buffer is the logical mapping, so that the current level buffer is the logical buffer LB. If this is not the case and it is another tree page, at least one more level must be traversed and so control proceeds to step 126 where the page numbers in logical order for the current tree page of the current level are read and placed into the next level buffer which has been developed. The current tree page is incremented so that the next actual tree page is read. Control then proceeds to step 128 to determine if the last tree page in the current level was read. If not, control returns to step 126. By this manner the entire current tree level is traversed until all of the pages in logical order at the next lower level are present in logical order in the next level buffer being filled.

If the last tree page had been read in step 128, control returns to step 120 where the next level buffer is again developed. Control proceeds to step 122 to again read the first page indicated by the current level buffer. In this case it is assumed to be a leaf page as we have traversed to the end and control then proceeds to step 130, which also where control proceeds from step 112 if the root page was indeed was a leaf page. In step 130 the physical buffer PB is set up such that one word is present for each page in the index file and all the values in the physical buffer PB are zeroed to allow indication of the various root and tree pages when the index file is read. Control then proceeds to step 132 (FIG. 10B) where the transposition from the logical buffer LB to the physical buffer PB is performed. This is the transposition as shown from FIG. 6 to FIG. 7. After the transposition has been completed in step 132, control proceeds to step 134 where the index file is closed as a random access file and is opened as a sequential access file to allow fast and optimal reading of the index file I. Control then proceeds to step 136 where a write routine 200 is commenced. As the particular entries will have to ultimately be written to a new index file, it is desirable that the various write operations occur as concurrently as possible with the particular read operations where the large buffer is filled. In the normal case the particular index files can be quite long and generally are not horribly disorganized, so it is usually possible to begin writing the early portions of the index file structure and the early leaf pages while the order sequence 100 is completing the final pages. This allows some overlapping given the length of the particular index files and helps speed overall operations.

Control then proceeds to step 138 where the large buffer B is set aside in the memory, with one page set aside per leaf page of the index file. Control then proceeds to step 140 where a mapping table is set up with one byte available per leaf page. The values of the map table are also cleared in step 140. The map table is used as a pointer to indicate whether a particular page in the large buffer B has been filled. This is used by the write sequence 200 to determine when the next block of leaf pages can be written to the new index file. Control then proceeds to step 142 where the next page in the current index file which is being reorganized is sequentially read. Control proceeds to step 144 where the physical page number is used as a look up into the physical buffer PB to determine the logical order of this particular leaf page. Control proceeds to step 146 to determine if the logical order was zero. If so, this is an indication that it is a system, root or tree page and control proceeds to step 148. If not, control proceeds to step 150 where the leaf page is written into the logical page number location in the large buffer B and a value of FF is written to the associated map table location to indicate that this page in the large buffer B has been occupied. Control then proceeds to step 148, where the sequential page number is incremented. Control then proceeds to step 152 to determine if the last page in the index file has been read. If not, control returns to step 142 and the process continues until all of the leaf pages have been read in physical order and placed in logical order in the large buffer B. If the last page was read, control proceeds to step 154 which is the end of the order sequence 100.

As noted above, the write sequence 200 (FIG. 11A) is used to write the leaf pages which have been placed into the large buffer B back into a new index file which is then converted to be the index file that has been reorganized. The write sequence 200 commences at step 202 where the names of the new and old index files are obtained. Control proceeds to step 204 to determine the actual file name of the old index file, in a manner similar to that of step 104. Control proceeds to step 206 where the actual file size and type of the old index file is obtained in a manner like that of step 106. Control proceeds to step 208 where a new index file of the same type and size, but having a different name, is set up. This new index file will become the reorganized index file. Control then proceeds to step 210, where this new index file is set up for sequential write operations. In step 212 the header information and space map information is written to pages 0 and 1. Control then proceeds to step 214 where a dummy root page is written to page 2 of the new index file. As the root page is not determined until one of the last steps, as it is the highest level and all the tree pages must have been developed, a dummy must be written in this case to allow the sequential operations. Control then proceeds to step 216 where a map table pointer is set to a value of 1. This is so that tracking through the map table can be developed. Control then proceeds to step 218 where the next 16 table entries in the map table are checked to determine if they are all equal to the value FF. If not, control proceeds to step 220 (FIG. 11B) to determine if all of the input pages have been processed. If not, control proceeds to step 222 to wait momentarily as now the write sequence 200 has gotten ahead of the read operation and placement in memory of the order sequence 100. Control proceeds from step 222 to step 218 so that this process continues until 16 entries are available.

If 16 entries were available in step 218, control proceeds to step 224, where the map table value is incremented by 16 and a pointer is indicated to a first buffer which is used to build leaf pages. Control then proceeds to step 226 where the 16 leaf pages are obtained from the large buffer B and provided to a DB2 rebuild operation and finally written sequentially to the new index file. Control then proceeds to step 228 to add the highest key value contained for those particular 16 leaf pages to the tree page of the next level up which is slowly being developed. Control then proceeds to step 230 to determine if the particular tree page which is being developed is full. If so, control proceeds to step 232 where the tree page is then written to the index file. If not, control proceeds to step 234 to determine if any more of the 16 input pages which are being transferred are present. If so, control proceeds to step 226 and the leaf page is rebuilt according to DB2 format and written sequentially. If there are no more pages from the 16 particular pages being written, control proceeds to step 220 to again determine if all the input pages are completed. Assuming they are not, control proceeds to step 222 and then to step 218 so that in this manner the write sequence 200 generally tracks and walks up the large buffer B until all of the leaf pages have been written.

If in step 220 all of the input pages have been processed, control proceeds to step 236 where the final leaf page is written to the index file. Control then proceeds to step 238 where this last leaf page is written to the previous prior level up tree page. Control then proceeds to step 240 to determine if the if the tree page was a root page. If the tree page which has now been completed is not a root page, control proceeds to step 242 where the tree page is written into the new index file. Control then returns to step 238 where this final entry is then placed into the tree page at again the next level up and control then proceeds to step 240. This loop is continued until finally all of the tree pages have been completed and the final entry is ready to be made into the root page.

When the root page receives its final entry, control proceeds from step 240 to step 244 where the new index file is closed as a sequential write and is opened as a random write because now it is time to write the appropriate root page. Control then proceeds to step 246 where the developed root page is written to page 2 of the index file I. Control proceeds to step 248 where random access to the new index file is closed and then on to step 250 where the memory utilized by the large buffer, the map table and various other buffers is released. Control then proceeds to step 252 where the old index file is deleted and all references are redirected to the new index file which has now been reordered. Control then proceeds to step 254 which is the end of the write sequence 200.

In a possible enhancement, it may be appropriate to scan the logical buffer LB and obtain the first few logical leaf pages in a random fashion before beginning the sequential operation of step 142 and on. One appropriate case for this operation would be when a high percentage of the first logical pages are near the physical end of the index file. If this is the case, the write sequence 200 will have little actual concurrency with the order sequence 100, as the write sequence 200 would have to wait until the end of the index file is read into the large buffer B before the first 16 entries are available for writing to the new index file. In this case, where there is a great disparity between logical and physical order for a short period, it may be more efficient to randomly read some leaf pages to allow greater actual concurrency between the order and write sequences 100 and 200 and a reduced total time.

Therefore when this sequence is completed in step 254 the reorganization of the index file has been completed, as noted above without a conventional sort operation. Because the majority of the operations are done in sequential fashion and no actual sorting is actually done, the above method operates at a very rapid rate so that an index file can be rebuilt in a very short time. Tests performed on a series of actual index files have indicated that program according to the indicated method is approximately 30 times as fast, that is it takes 1/30 of the time, of the index reorganization utility provided by IBM and is in many cases at least 10 times as fast as the reorganization utilities provided by other third parties. With these tremendous reductions in reorganization time, a system administrator is much more often able to reorganize the index file, thus allowing more optimal operations of the database.

The foregoing disclosure and description of the invention are illustrative and explanatory thereof, and various changes in the size, components and method of operation may be made without departing from the spirit of the invention.

I claim:

1. A method for reorganizing an index file on a storage system using a computer, the index file having a tree structure with tree and leaf pages, the tree pages for indicating the logical order of tree pages and leaf pages, the method comprising the steps of:

reading the tree pages to determine the logical order of the leaf pages;

preparing a buffer correlating the leaf page physical position with its logical position for each leaf page;

preparing a large buffer for receiving a copy of all the leaf pages in the index file;

sequentially reading the leaf pages from the index file;

for each sequentially read leaf page, determining the leaf page logical position by reference to said physical to logical buffer and placing the read leaf page in said large buffer at a location corresponding to the leaf page logical location;

sequentially writing the contents of said large buffer to a new index file; and substituting said new index file for the index file being reorganized.

2. The method of claim 1, further comprising the step of:
   preparing a buffer correlating the leaf page logical position to its physical position for each leaf page; and
   wherein said step of preparing said physical to logical buffer includes transposing said logical to physical buffer.

3. The method of claim 1, wherein said sequential reading and sequential writing steps occur at least partially concurrently.

4. The method of claim 3, further comprising the steps of:
   preparing a map table having an entry for each leaf page;
   indicating in said map table at a location corresponding to a location in said large buffer that a leaf page has been placed said large buffer location; and
   wherein said step of sequentially writing includes reviewing said map table to determine if a next series of large buffer locations have received leaf pages, and if so, sequentially writing the received leaf pages to the new index file.

5. The method of claim 1, wherein said step of sequentially writing includes developing tree pages as the leaf pages are written and writing said tree pages to said new index file as filled in sequence with the leaf pages.

* * * * *